United States Patent [19] | [11] Patent Number: 4,732,182
Gorsha | [45] Date of Patent: Mar. 22, 1988

[54] WORK SUPPORT

[76] Inventor: Russel P. Gorsha, 5-4269-1, Swanton, Ohio 43558

[21] Appl. No.: 886,965

[22] Filed: Jul. 18, 1986

[51] Int. Cl.⁴ ........................................ B23Q 3/00
[52] U.S. Cl. ........................................ 144/198 A; 269/304
[58] Field of Search ............. 144/198 A, 198; 83/875; 269/303-306, 315, 900

[56] References Cited

U.S. PATENT DOCUMENTS

| | | | |
|---|---|---|---|
| 1,651,846 | 12/1927 | Stauder | 144/198 A |
| 2,085,236 | 6/1937 | Tautz | 144/198 A |
| 2,895,513 | 7/1959 | Cowley | 144/198 A |
| 2,941,556 | 6/1960 | Hammerling | 83/875 |
| 4,157,819 | 6/1979 | Meyer | 269/900 |

*Primary Examiner*—Robert C. Watson
*Attorney, Agent, or Firm*—John C. Purdue

[57] ABSTRACT

A work support which has a channel with a web and side walls is disclosed. The channel is sized for sliding engagement with a fence and on a table of an associated saw. The work support has two substantially planar positioning surfaces which are carried by the channel at substantially 90° to one another. One of the two positioning surfaces is substantially parallel to the guiding surface of the fence of the associated saw when the channel is slidably engaged therewith. The support also includes two threaded members, one for urging the work piece against each of the positioning surfaces.

2 Claims, 8 Drawing Figures

WORK SUPPORT

BACKGROUND OF THE INVENTION

1. Field of the Invention

This invention relates to a work support, and, more particularly, to a support which has a channel for sliding engagement with a fence and on a table of an associated saw. The support is admirably suited for use in making mortise and tenon joints.

2. The Prior Art

Work supports which are designed to operate with an associated saw have been marketed. One such support has a plate to which an angled member can be clamped in any of a plurality of positions. When the plate is placed on the table of a saw and an integral slide is received in a miter groove of the table, a positioning face of the angled member extends at 90° to the table and parallel to the saw blade when the blade is at a right angle to the table. A cut can be made in an end of a work piece clamped to the positioning face; the distance from a surface of the work piece to the cut depends on the relative positions of the angled member and the plate.

SUMMARY OF THE INVENTION

The instant invention is a work support which has a body that is operable for steady sliding movement on a saw table, and a guide which is operably associated with the body and associatable with a saw. The guide is effective, when operably associated with a saw, to prevent sliding movement of the body on the saw table in all directions except back and forth along a given straight line. The support has two substantially planar positioning surfaces which are carried by the body at substantially 90° to one another; one of the two, when the body is on the working surface of the saw table and the guide is operably associated with the saw, is substantially parallel to a plane perpendicular to the working surface of the saw table which intersects the given straight line. The support also includes two threaded members or other means, one for urging the work piece against each of the positioning surfaces.

DESCRIPTION OF THE PREFERRED EMBODIMENTS

Figure 1:
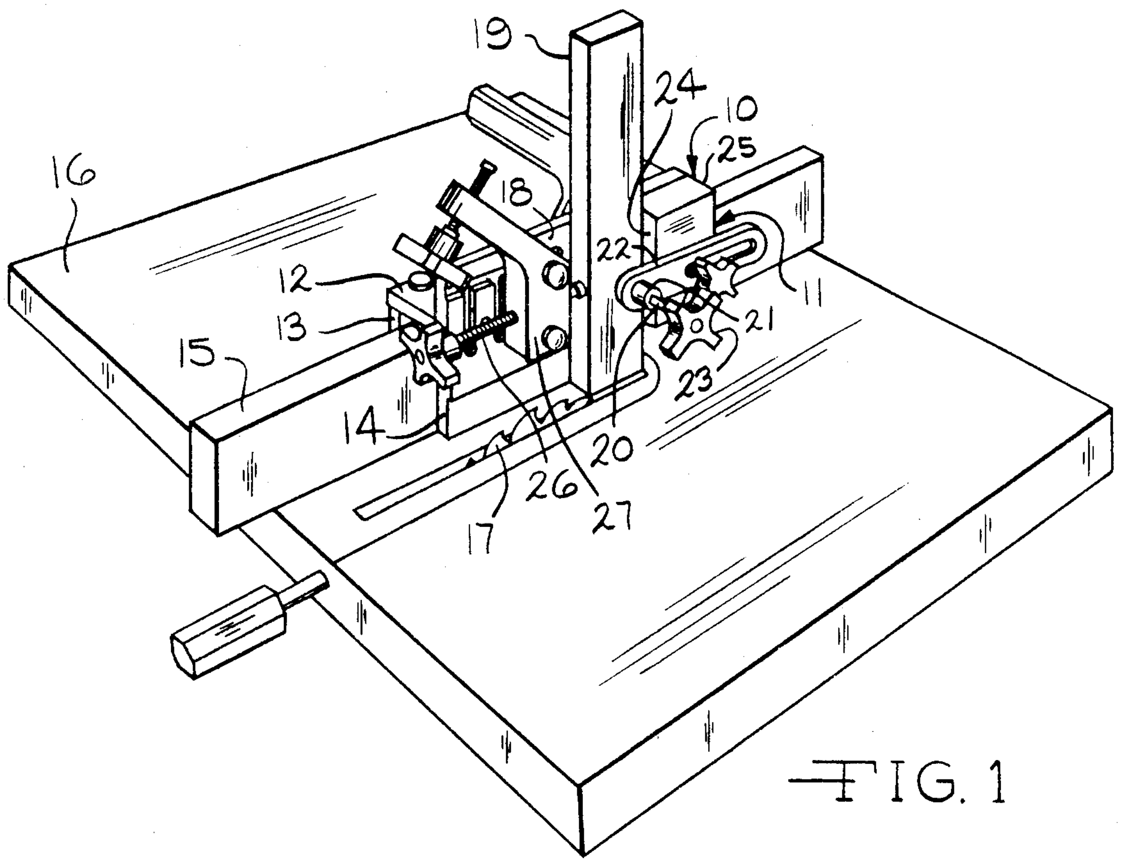
FIG. 1 is a somewhat schematic perspective view showing a work piece supported by a work support according to the invention with a channel thereof in sliding engagement with a fence and on a table of an associated saw.
Figure 6:
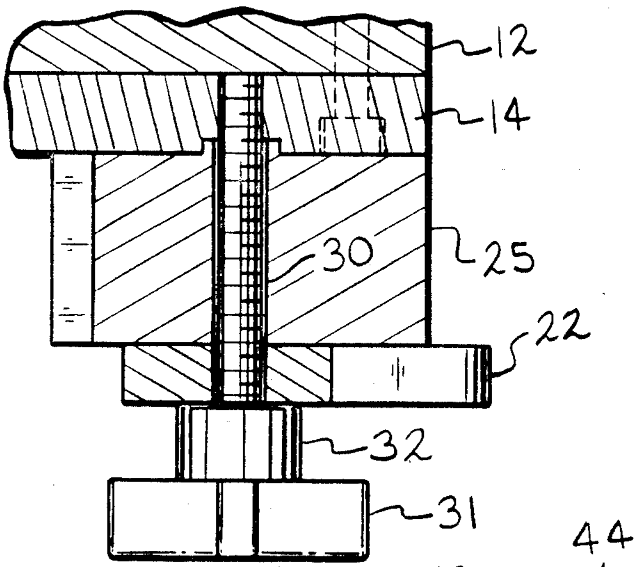
FIG. 6 is a horizontal sectional view taken along the line 6—6 of FIG. 2.

Referring in more detail to the drawings and, in particular, to FIG. 1, a work support according to the invention indicated generally at 10 comprises a channel 11 having a web 12 and opposed sidewalls 13 and 14. The channel 11 is slidingly engaged with a fence 15 and on a top 16 of a circular saw which includes a blade 17. As best seen in FIG. 3, the side wall 14 extends beyond the web 12 of the channel 11 and has a vertically extending planar positioning surface 18 (FIG. 1) against which a work piece 19 is urged by a threaded stem 20 which is turned into a boss 21 of a slide 22. The stem 20 has a handle 23. The work piece 19 is also urged against a planar positioning surface 24 of a block 25, in this case by a threaded stem 26 which is turned into a block 27. The block 25 is keyed against rotation relative to the side wall 14, by a key 28 (FIG. 3) which is received in a keyway 29 (FIG. 2) of the wall 14. As best seen in FIG. 6, a threaded stem 30, which has a handle 31, extends through the slide 22 and the block 25 and is threaded into the side wall 14 so that, when the stem 30 is tightened, a hub 32 thereof bears against the slide 22 to prevent movement of the block 25 out of its keyed engagement with the side wall 14.

Figure 2:
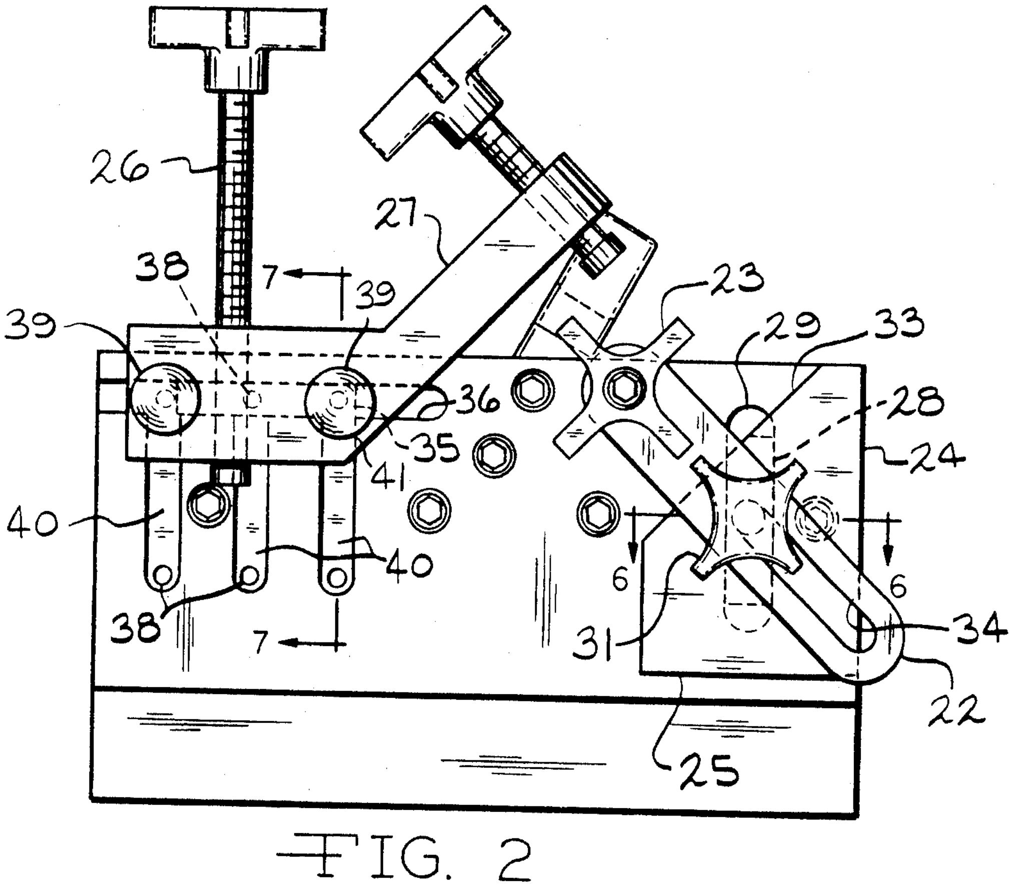
FIG. 2 is a right side view of the work support of FIG. 1.
Figure 3:
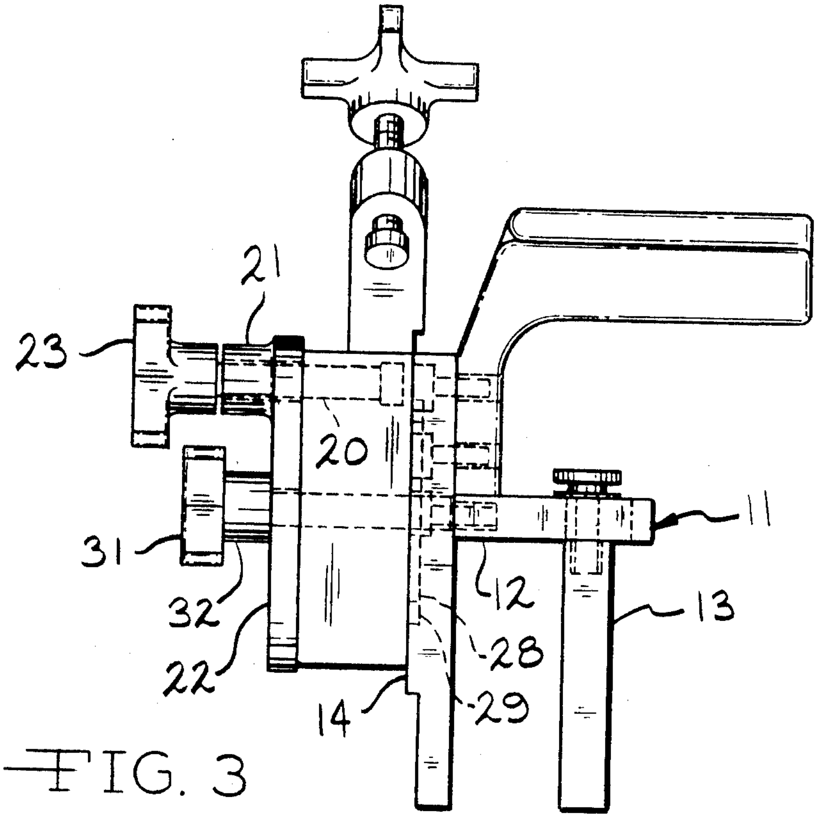
FIG. 3 is a front view of the work support.

The block 25 can be rotated 180° from the position shown in FIG. 1 to that shown FIG. 2, so that a planar positioning surface 33 when extends at an angle of substantially 45° when the block 25 is in the FIG. 2 position is presented to a work piece (not illustrated in FIG. 2). A slot 34 makes it possible for the slide 22 to be moved upwardly and to the left from the position shown in FIG. 2 or to the left from the position shown in FIG. 1 to accommodate work pieces of different sizes. Such movement is possible when the threaded stem 30 is loose, but is prevented by friction of the slide 22 with the hub 32 and with the block 24 when the threaded stem is tight.

Figure 7:
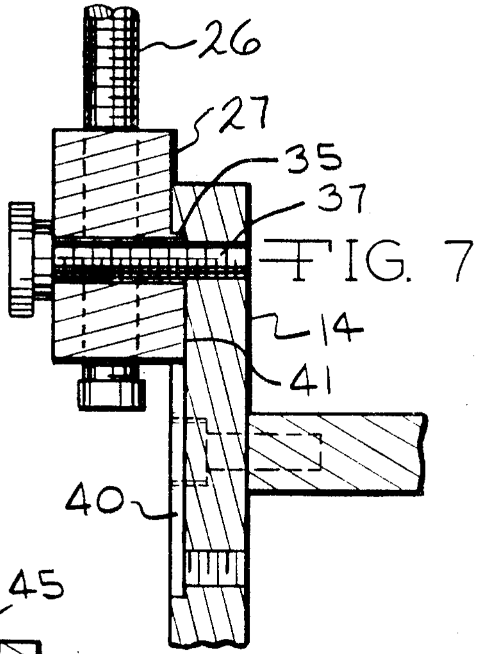
FIG. 7 is a view in vertical section taken along the line 7—7 of FIG. 2.

The block 27 is shown in FIG. 1 mounted so that the threaded stem 26 extends horizontally therethrough, and is shown in FIG. 2 mounted so that the stem 26 extends vertically because the block 27 has been rotated 90°. In the FIG. 2 position, a key 35 on the block 27 is engaged in a horizontal keyway 36 in the side wall 14, and two threaded stems 37 are turned into threaded holes 38 in the side wall 14 (one of the threaded stems 37 and its head 39 are shown in FIG. 7). There are also three vertical keyways 40 in the side wall 14, all sized to receive the key 35 of the block 27, and each having two of the threaded holes 38, one at the top and one at the bottom, spaced to receive the threaded stems 37. When a workpiece is to be mounted in a vertical position, the key 35 is positioned in whichever one of the vertical keyways 40 provides the desired spacing between the blocks 25 and 27, and the threaded stems 37 are turned into the threaded holes 38 in that keyway. The key 35 has a portion 41 which extends downwardly in FIGS. 2 and 7, filling the keyway 40 which is on the right in FIG. 2. The key portion 41 is received in the keyway 40 on the right when the block 27 is positioned as shown in FIG. 2, or in the horizontal keyway 36 when the key 35 is received in any of the vertical kyways 40, in any case positioning the block 27 so that the threaded stems 37 are aligned with the appropriate ones of the threaded holes 38.

As shown in FIG. 2, the block 27 also has a threaded stem 42 with a handle 43 which is used to urge a work piece (not illustrated in FIG. 2) into contact with the positioning surface 33.

Figure 8:
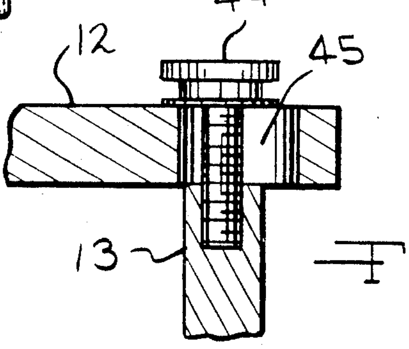
FIG. 8 is a vertical sectional view taken along the line 8—8 of FIG. 4.
Figure 4:
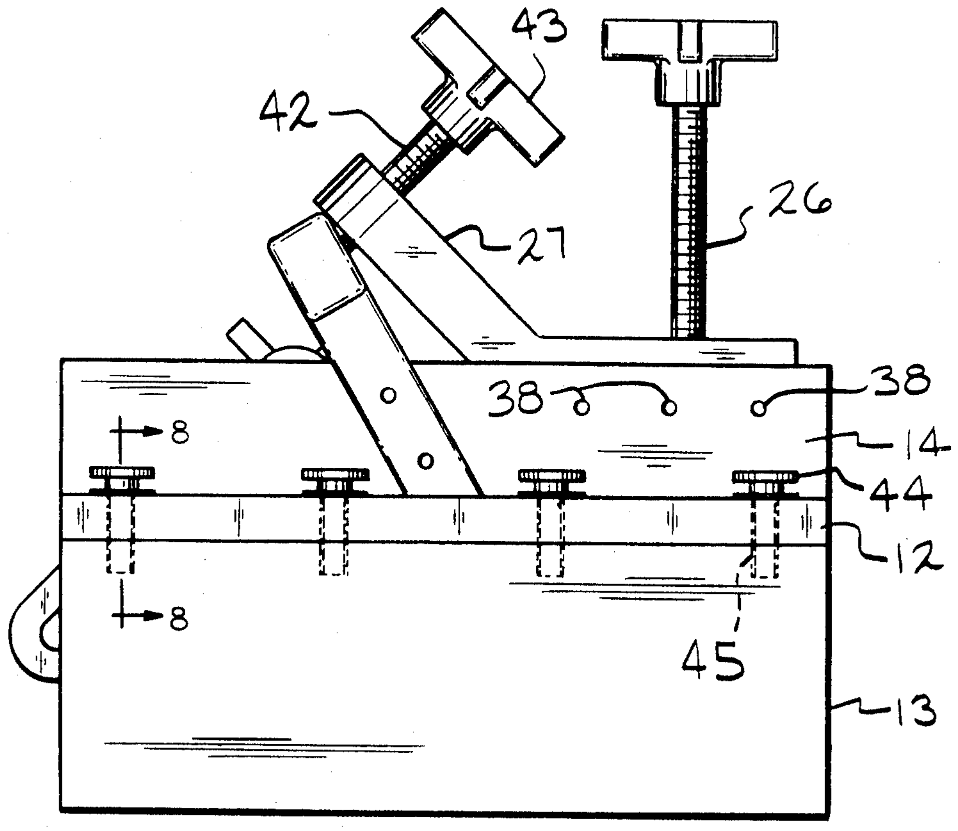
FIG. 4 is a left side view of the work support.
Figure 5:
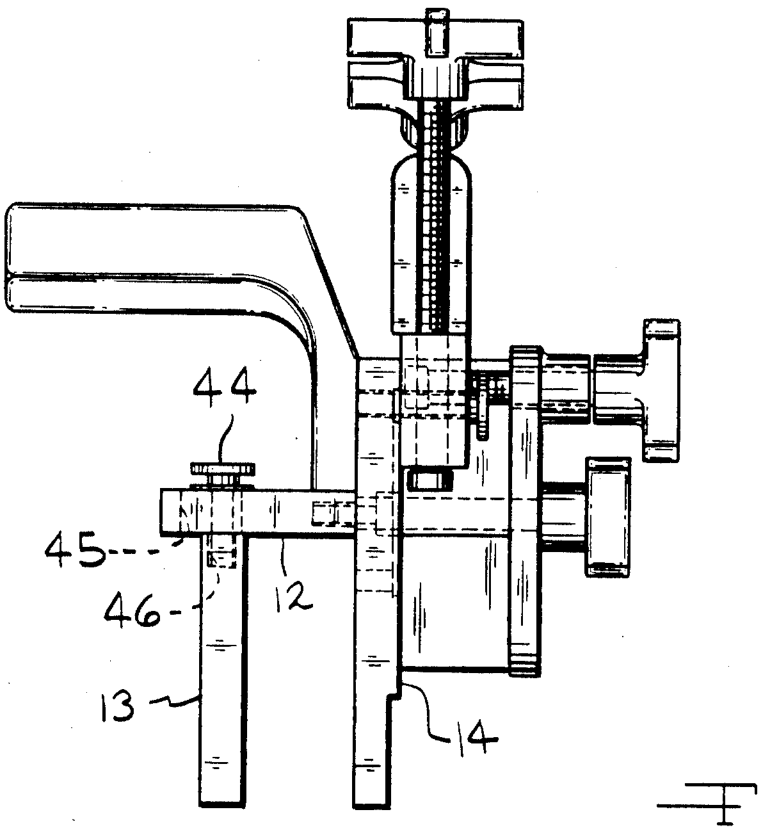
FIG. 5 is a rear view of the work support.

Referring, particularly, to FIGS. 4, 5 and 8, threaded retainers 44 attach the web 12 to the side wall 13, extending through slots 45 in the former and being turned into threaded holes 46 in the latter. The slots 45, as best seen in FIGS. 5 and 8, are considerably wider (from left to right in these views) than the retainers 44. As a consequence, the spacing between the side walls 13 and 14 can be varied considerably to accommodate fences of different widths.

It will be appreciated that the work support of the instant invention is capable of supporting work pieces of various sizes in different positions, and of positioning them accurately relative to a saw blade. This capability enables the making of accurate cuts as is often necessary in cabinet making, for example to produce mortise and tenon joints. The position of the fence of the saw itself determines the distance from a surface of a work piece at which a cut is made, while the position of the saw blade determines the depth of the cut and the angle.

Although only a single embodiment of a work support has been shown in the attached drawings and described in connection therewith, it will be apparent that various changes and modifications can be made from the specific disclosure without departing from the spirit and scope of the invention as defined in the attached claims.

I claim:

1. A work support comprising a channel having a web and side walls operable to straddle a fence of a saw and for steady sliding movement on a saw table, the fence, when operably associated with a saw, being effective to prevent sliding movement of said channel on the saw table in all directions except back and forth along a given straight line, means having a first substantially planar positioning surface, means comprising a block which is physically separable from the rest of the support, and having a second substantially planar positioning surface, said two last named means being carried by said channel so that the second positioning surface extends at substantially 90° to the first positioning surface and, when said channel is on the working surface of the saw table and the fence is operably associated with the saw, the first positioning surface is substantially parallel to a plane perpendicular to the working surface of the saw table which intersects the given straight line, means for keying said block to the support to prevent sliding movement between said block and the support, a threaded member operable, when said block is keyed to the support, to prevent movement of said block out of keyed engagement with the support, means for urging a work piece against the first positioning surface, and means for urging a work piece against the second positioning surface.

2. A work support comprising a channel having a web and side walls operable to straddle a fence of a saw and for steady sliding movement on a saw table, the fence, when operably associated with a saw, being effective to prevent sliding movement of said channel on the saw table in all directions except back and forth along a given straight line, means havng a first substantially planar positioning surface, means having a second substantially planar positioning surface, said two last named means being carried by said channel so that the second positioning surface extends at substantially 90° to the first positioning surface and, when said channel is on the working surface of the saw table and the fence is operably associated with the saw, the first positioning surface is substantially parallel to a plane perpendicular to the working surface of the saw table which intersects the given straight line, said lastnamed means comprising a block which is physically separable from the rest of the support, and which additionally includes a third positioning surface and means for keying said block to the support in at least two different relative rotational positions, one in which the second positioning surface extends at a given angle toward the table of a saw with whose guide the support is engaged and one in which the third positioning surface extends at a different angle toward the table of the saw, to prevent sliding movement between said block and the support, and a threaded member operable, when said block is keyed to the support, to prevent movement of said block out of keyed engagement with the support, means for urging a work piece against the first positioning surface, and means for urging a work piece against the second positioning surface.

* * * * *